United States Patent [19]

Higginbotham et al.

[11] Patent Number: 4,795,777

[45] Date of Patent: Jan. 3, 1989

[54] SINGLE COAT FLUOROCARBON PROTECTIVE COATINGS PROVIDING THE APPEARANCE OF ANODIZED ALUMINUM

[75] Inventors: Clark A. Higginbotham, Crystal Lake; Paul T. West, Roselle, both of Ill.

[73] Assignee: DeSoto, Inc., Des Plaines, Ill.

[21] Appl. No.: 6,148

[22] Filed: Jan. 23, 1987

[51] Int. Cl.$^4$ .............................................. C08K 3/08
[52] U.S. Cl. .................... 524/441; 524/449; 525/160
[58] Field of Search ............................. 524/441, 449

[56] References Cited

U.S. PATENT DOCUMENTS 4,123,401 10/1978 Berghmans et al. ................ 524/413

Primary Examiner—Joseph L. Schofer
Assistant Examiner—Peter Mulcahy
Attorney, Agent, or Firm—Dressler, Goldsmith, Shore, Sutker & Milnamow, Ltd.

[57] ABSTRACT

A thermosetting solvent solution coating composition is disclosed which cures to provide the appearance of anodized aluminum. This composition comprises a dispersion of a fluorocarbon polymer in volatile organic solvent which is pigmented with a finely divided mica (preferably titanium dioxide coated) and an aluminum flake (which is preferably acid-resistant) to provide a combination of whiteness and transparancy providing an anodized aluminum appearance. This pigmented dispersion contains a thermosetting acrylic, preferably an hydroxy-functional acrylic copolymer and a curing agent therefor to provide a thermosetting cure which enhances the hardness and abrasion resistance of the coating, and enough additional pigment to provide sufficient coloration to allow production control without providing enough opacity to hide the whiteness and metallic appearance provided by the combination of mica and aluminum flake. A flatting agent to reduce gloss and a wax to enhance surface lubricity are also preferably present.

19 Claims, No Drawings

SINGLE COAT FLUOROCARBON PROTECTIVE COATINGS PROVIDING THE APPEARANCE OF ANODIZED ALUMINUM

DESCRIPTION

1. Technical Field

This invention relates to single coat fluorocarbon protective coatings providing the appearance of anodized aluminum, such coatings being particularly useful for the coating of aluminum in the formation of coated aluminum panels for architectural purposes.

2. Background Art

Coated aluminum panels are now in use in buildings where they must have an attractive appearance which will withstand long periods of exposure to the elements. Since the aluminum panel itself will not sustain such exposure, industry now either employs sealed anodized aluminum or coats the aluminum with fluorocarbon polymer coatings. Both of these alternative posses significant disadvantages.

The production of sealed anodized aluminum introduces expense and hazard and the products are inadequate for several reasons. First, the anodized aluminum cannot be postformed without cracking, as is required to convert a coil of anodized aluminum into window sealers and panel structures. Second, although the anodized layer is very hard, it does not adequately resist abrasion, and is scratched when it rubs against a sharp-edged metallic objects. These scratches are highly visible. Third, and while the anodized layer can be dyed, these dyes are not light stable and change color with time, so colored anodized surfaces are not practical. Even if tin colorants are used, which requires expensive processing, the anodized surface still has the above defects. Moreover, the anodized surfaces are rapidly degraded by contact with strong bases, such as caustic and amines. Acids are also not well resisted, such as hydrochloric acid, sulfuric acid, nitric acid and phenol. As a matter of interest, the anodized products discussed above are sealed in boiling water to render them nonporous.

The coating of aluminum with fluorocarbon polymer coatings is also subject to various inadequacies. First, it is usually necessary to apply three layers, a primer, a properly pigmented layer and then a topcoat. This adds to the expense of the coating system. Moreover, these coatings are medium gloss vividly colored systems, and thus they do not resemble the low gloss transparent surfaces provided by anodization.

As will be evident, the industry has desired a simple coating system which would provide a durable coating for aluminum which would resemble an anodized surface, but which would accept postforming without cracking and be more abrasion resistant than the anodized surfaces now available. It was also desired to have a coating which would resist both acids and bases. These objectives as well as the correction of the other noted inadequacies are included in this invention.

DISCLOSURE OF INVENTION

In accordance with this invention, a thermosetting solvent solution coating composition is provided in which a dispersion of a fluorocarbon polymer, preferably finely divided particles of polyvinylidene flouride polymer, in volatile organic solvent, is pigmented with a finely divided mica (preferably coated with 10% to 45%, more preferably 15% to 30%, of titanium dioxide for enhanced whiteness) and with a finely divided aluminum flake (which is preferably acid-resistant) to provide a combination of whiteness and transparancy providing an anodized aluminum appearance. This pigmented system is combined with a thermosetting acrylic copolymer, preferably constituted by an hydroxy-functional acrylic copolymer and a curing agent therefor (preferably an aminoplast resin), to provide a thermosetting cure which enhances the hardness and abrasion resistance of the coating after it is baked onto an aluminum substrate. A solvent solution of the foregoing is combined with enough additional pigment to provide sufficient coloration to hide nonuniformities (for production control) without providing enough opacity to hide the whiteness and metallic appearance provided by the combination of mica and aluminum flake.

In preferred practice, a flatting agent is added to reduce the gloss, preferably into the range of 10–20% reflectance measured on a 60° gloss meter. This reduced gloss makes the cured coating more strongly resemble anodized aluminum. It is also desirable to add a wax to provide surface lubricity which aids mar resistance, the addition of wax for this purpose being conventional.

The resulting compositions, when applied to aluminum substrates and baked at a temperature sufficiently high to coalesce the dispersed particles of fluorocarbon polymer into a continuous film, has the transparent appearance of anodized aluminum and may be clear or tinted to any desired color. The coatings are very durable and retain their color on exterior exposure. The coatings also resist both acids and alkalis, and the coated aluminum can be postformed into panels without cracking. The preferred compositions are uniform in appearance and strongly resist change of color on exposure to the elements without overcoating as well as delamination from the aluminum substrate.

Curiously, it is important to apply the coatings of this invention directly to the aluminum substrate and not to the primers previously used for adhering fluorocarbon polymers to such substrates. In prior practice these primers were needed to get good adhesion, but in this invention it is found that the conventional primers reduce adhesion and actually cause discoloration and delamination on exterior exposure.

It is desired to point out that the compositions of this invention have a relatively high solids content which helps to apply coatings which have a dry thickness of at least 0.5 mil. In preferred coil coating practice, the cured coatings have a thickness of from 0.7 to 1.2 mil, and in the preferred practice of spray coating, the cured caotings preferably have a thickness of from 1.2 to 2.0 mils.

The main difference between coil coating compositions and spray coating compositions is that spray coatings usually involve organic solvents which are less odorous. Accordingly, the isophorone solvent preferred in coil coating compositions is replaced by 2-ethoxy ethanol acetate which has a less objectionable smell. Also, a lower viscosity is needed for spray application (typically 20–25 seconds with a No. 2 Zahn cup), so the solvent content may be increased to provide the desired spray viscosity.

Thermosetting acrylics are known to modify fluorocarbon coatings by increasing their hardness and solvent resistance, and these are known to include N-methylol-functional acrylic copolymers. However, these do not provide the clearest coatings, so it is preferred in this invention to employ a combination of an hydroxy-functional acrylic copolymer together with a curing agent therefore. These, especially with an aminoplast curing agent, enable one to obtain better color, higher solids content coating compositions, and harder and more solvent-resistant cured coatings.

While aminoplast resins are preferred for curing the hydroxy-functional acrylic copolymer, it is also possible to use any curing agent reactive with hydroxy functionality, such as phenoplast resins or blocked polyisocyanates.

Various solvents are commonly used for thinning the compositions of this invention to the viscosity desired for application, such as methyl ethyl ketone, toluene, xylene, butyl acetate, ethyl acetate, and the like. The selection is made based on ambient conditions and the preference of the coating applicator. The compositions of this invention, as shipped prior to thinning to application viscosity, possess a high resin solids content of at least about 35%, preferably in the range of 40% to 55%.

The mica must be finely divided, platelets having their longest dimension preferably less than 100 micrometers. A product from the Mearl Corporation (New York, N.Y.) identified as Exterior Mearlin Bright White being preferred. This product contains 72–78% mica, 22–28% titanium dioxide coated theron, and has a platelet size (longest dimension) ranging from 10–35 micrometers. Another particularly useful mica which may be used is AFFLAIR pearl luster pigments available from EM Chemicals (Hawthorne, N.Y.).

The aluminum flake should also be finely divided, it being preferred that all of the flake pass through a 100 mesh screen. A preferred commercial product is Sparkle Silver 3141-ST which is an aluminum paste produced by Silberline Manufacturing Co., Inc. of Lansford, Pa. The aluminum flake in this product is non-leafing and acid-resistant and 99% passes through a 325 mesh screen.

Referring more particularly to the proportion of mica and aluminum flake, these together provide the bulk of the pigment solids. The total weight ratio of mica and aluminum flake to resin solids is in the range of 0.05 to 0.4, preferably in the range of from 0.1 to 0.3. The mica is preferably used in a weight ratio with respect to the aluminum of from 1:1 to 6:1, preferably from 2:1 to 5:1.

The fluorocarbon polymer is preferably a homopolymer of vinylidene fluoride, i.e., polyvinylidene fluoride, but one may also employ copolymers of vinylidene fluoride containing a major proportion of vinylidene fluoride. These copolymers desirably contain at least 95 mol percent of the vinylidene fluoride. Suitable comonomers are the halogenated ethylenes, such as symmetrical dichlorodifluoroethylene, 1,1-2-trifluoro-2-chloroethylene, tetrafluoroethylene, vinyl chloride, vinyl acetate, and others. While vinylidene fluoride homopolymer is the preferred fluorocarbon polymer, the corresponding vinyl fluoride polymers and copolymers (including terpolymers, etc.) are also useful.

It is found that it is preferred that the fluorocarbon polymer be in finely divided form, and polyvinylidene fluoride in such form is commercially available under the trade designation Foraflon from Atochem (Glen Rock, N.J.).

The preferred proportion of the fluorocarbon polymer component is at least about 47% of total resin solids, preferably at least 70%. The preferred fluorocarbon polymer is polyvinylidene fluoride, the Foraflon product being preferred. One may also use Kynar 500 from Pennwalt (King of Prussia, Pa.), or the product Solef from Soltex Polymer Corporation (Houston, Tex.).

The hydroxy-functional copolymer is subject to wide variation so long it is a solvent-soluble copolymer of monoethylenic monomers containing at least about 3% up to about 35% of hydroxy monomer. The hydroxy functionality is essentially the only reactive group in the copolymer, albeit a small amount of carboxyl functionality is permissible, though not essential. The preferred hydroxy monomer content is from 5% to 15%.

Various hydroxy-functional monomers can be used, but it is preferred to use an hydroxyalkyl ester of a monocarboxylic acid, such as acrylic acid or methacrylic acid. The alkyl groups contemplated are primarily those containing from 2–4 carbon atoms and illustrated by ethyl, propyl or butyl. The preferred hydroxy-functional monomer is 2-hydroxyethyl acrylate. Hydroxy alkyl ethers, such as the hydroxyethyl ether of allyl alcohol, are also useful.

The hydroxy-functional copolymer is preferably the copolymer produced by solution copolymerization in the presence of free-radical polymerization catalyst of monoethylenically unsaturated monomers including the required proportion of hydroxyalkyl acrylate. The other monomers are preferably acrylic esters and methacrylic esters with alcohols containing from 1 to 12 carbon atoms, preferably 1 or 2 carbon atoms. Most preferably, the other monomers consist of at least 50% of methyl methacrylate and the balance ethyl acrylate, most preferably from 55% to 65% methyl methacrylate, balance ethyl acrylate.

The hydroxy-functional copolymer can be used in an amount of from 5% to 50% of total resin solids, preferably from 20% to 45% thereof. The curing agent is used in an amount sufficient to cure the hydroxy-functional copolymer, usually in an amount of from 3% to 30%, preferably from 5% to 15% of the weight of the hydroxy-functional copolymer.

The preferred aminoplast curing agent is simply a formaldehyde condensate with an amine, preferably melamine, to provide a heat-hardening methylol-functional resin. While many aminoplast resins are broadly useful, such as urea formaldehyde condenstates and benzoguanamine formaldehyde condensates, it is preferred that the aminoplast resin be a polyalkoxymethyl melamine resin in which the alkoxy group contains from 1–4 carbon atoms. Appropriate melamine-formaldehyde condensates are readily available in commerce and are usually etherified with lower alcohols for use in organic solvent solution, as is well known.

Blocked isocyanate curing agents are also useful, such as isophorone diisocyanate blocked with methyl ethyl ketoxime or octyl alcohol-blocked 2,4-toluene diisocyanate. The class of blocked isocyanate curing agents is well known, and these agents are well known to effect cure by forming urethane groups with the hydroxy functionality on the coating composition when baking causes the blocked isocyanate groups to dissociate and become active.

All ratios and proportions herein are by weight, unless otherwise stated.

The volatile solvents are selected in accordance with common practice for the formulation of baked coatings. Thus, ether acetate solvents and isophorone are preferred, as will be illustrated, and ketones, like methyl ethyl ketone, or aromatic hydrocarbons, like xylene are usually used to thin the compositions to desired viscosity.

The inorganic pigments which are used are preferably those which introduce as little opacity as possible. Thus, iron oxide pigments are particularly useful to provide brown, red or yellow coloration. When titanium dioxide is used, its proportion of use is minimized to avoid unduly hiding the metallic appearance provided by the mica and aluminum flake. Carbon black is useful since a small amount of it insufficient to hide the metallic appearance can provide an attractive and deep black appearance. An appropriate proportion of carbon black is illustrated by from 5 to 10 pounds thereof per 100 gallons of coating composition. One can also use a ceramic pigment, such as a copper-chrome (Shepherd #1 [Cincinatti, Ohio] may be used), but these are more costly.

While acidic catalysts may be included in the composition, they are not needed herein because the curing temperatures for the polyvinylidene fluoride polymer is high enough so that N-methylol cure of the hydroxy-functional copolymer does not require any added catalyst.

The invention is illustrated in the following example of preferred practice.

EXAMPLE

Premix 60 pounds of finely divided mica pigment coated with about 25% of titanium dioxide (Mearl Corporation product identified hereinbefore as Exterior Mearlin Bright White may be used), 18 pounds of an acid-resistant aluminum flake pigment (Sparkle Silver 3141-ST described previously may be used) in 36 pounds of xylol and 63 pounds of 2-butoxy diethylene glycol acetate. This premix is then thinned with 637 pounds of a 50% dispersion of a finely divided polyvinylidene fluoride homopolymer in isophorone (the finely divided polyvinylidene fluoride homopolymer provided by Atochem may be used) and 144 pounds of an hydroxy-functional copolymer (a 55% solids content solution of an hydroxy-functional acrylic copolymer in dipropylene glycol mono-acetate). The hydroxy-functional acrylic copolymer is a solution copolymer of 25% ethyl acrylate, 70% methyl methacrylate, and 5% of 2-hydroxyethyl acrylate.

There is then added 15 pounds of an etherified melamine-formaldehyde condensate [90% solution in organic solvent] (Monsanto product Resimene 740 or American Cyanamid product Cymel 303 [when thinned to 90% solids] may be used).

Then various colorations are added in small amounts in the form of shading pastes which are predispersions of pigments in organic solvent. In this way 4 pounds of titanium dioxide rutile, 0.5 pounds of carbon black, 0.4 pounds of red iron oxide and 0.5 pounds of yellow iron oxide are added. These shading pastes contribute minimum coloration to provide a clear silver-colored coating. The named proportions are enough to mask nonuniformities in the aluminum being coated and contaminations introduced by the various ingredients and contact with the production equipment, but there is too little of these colorants to be significantly visible. As a result, the composition of this invention when applied onto an aluminum plate and baked looks like sealed anodized aluminum.

The foregoing provides a composition suitable for coil coating by reverse roll coating (about 40% volume solids). For spray application additional solvent, such as xylol, toluol, methyl ethyl ketone or 2-butoxy ethanol, or the like, is added to about 25% to 30% volume solids. The viscosity desired will vary depending upon the spray equipment and atmospheric conditions.

When it is desired to have the clear appearance produced above modified by a color tint, then the proportion of added pigment is increased to provide the desired color. However, the proportion of pigment should be insufficient to render the coating substantially opaque which would destroy the anodized aluminum appearance.

To illustrate the production of a tinted product, the above example is modified by adding 5 pounds of lampblack per 100 gallons of the above clear composition. This is not enough to hide the sealed anodized appearance, but it introduces a deep black tint without destroying the transparent metallic appearance which is very attractive and hard to provide in the absence of this invention.

In some of the darker tinted products using spray application, the aluminum flake may be omitted. Spray allows thicker films, and with the darker colors, the whiteness provided by the aluminum flake is less prominent and can be omitted. To illustrate this modification of the invention, using 6–8 pounds of lampblack per 100 gallons of the above clear composition, and applying the composition by spray to deposit a dry film having a thickness of from 1.7–2.0 mils, the aluminum flake may be omitted.

The baking temperatures are not critical, but must be high enough to cause the polyvinylidene fluoride homopolymer particles, which are partly in solution and partly in dispersion, to coalesce into a continuous film. A temperature of at least about 450° F. for at least about 10 minutes is adequate for this purpose, and this is more than ample to cure the hydroxy copolymer to provide enhanced solvent resistance and improved hardness. In coil coating processes, the oven dwell temperature is sometimes only about 30 seconds, so an oven temperature in the range of 600° F. to 800° F. should be used.

In preferred practice, 1 pound of a flatting agent, such as DeGussa product OK-412 may be added to reduce the 60° gloss reading into the 10–20 range, and 34 pounds of a 30% xylene solution of wax, such as Polymekon wax, is added to improve surface lubricity and thus, to improve mar resistance. The proportion of flatting agent may be increased up to about 10 pounds.

It is helpful in this invention to employ aluminum of high quality and cleanliness. It is also desirable to pretreat the aluminum (class 1 pretreatment for spray application and class 2 pretreatment for coil application). These class designations are in accordance with ASTM D-1730. The above practices are not an essential of what has been invented, but instead represent routine procedure for the coating of aluminum to enable best performance.

What is claimed is:

1. A thermosetting solvent solution coating composition which cures to provide the appearance of anodized aluminum comprising a dispersion of a fluorocarbon polymer in volatile organic solvent, said fluorocarbon polymer being selected from the group consisting of polyvinylidene fluoride and polyvinyl fluoride, said dispersion being pigmented with a finely divided mica and an aluminum flake to provide a combination of whiteness and transparancy providing an anodized aluminum appearance, said pigmented dispersion containing a hydroxy-functional acrylic copolymer and a curing agent therefor to provide a thermosetting cure which enhances the hardness and abrasion resistance of the coating, and enough additional pigment to provide sufficient coloration to allow production control without providing enough opacity to hide the whiteness and metallic appearance provided by the combination of mica and aluminum flake.

2. A coating composition as recited in claim 1 in which said mica is coated with from 10% to 45% of titanium dioxide based on the weight of the coated mica and the platelets of said mica have a longest dimension of less than 100 micrometers.

3. A coating composition as recited in claim 1 in which said aluminum flake is acid-resistant and passes through a 100 mesh screen.

4. A coating composition as recited in claim 1 in which a flatting agent is present to reduce the gloss.

5. A coating composition as recited in claim 4 in which said flatting agent reduces the gloss into the range of 10–20% relfectance measured on a 60° gloss meter.

6. A coating composition as recited in claim 1 in which a wax is added to provide surface lubricity which aids mar resistance.

7. A coating composition as recited in claim 1 in which said fluorocarbon polymer is provided by finely divided particles of polyvinylidene fluoride homopolymer.

8. A coating composition as recited in claim 1 in which said hydroxy-functional copolymer is a solvent-soluble, hydroxy-functional copolymer of monoethylenically unsaturated monomers containing from 3% to 35% of hydroxy-functional monoethylenic monomer.

9. A coating composition as recited in claim 8 in which said hydroxy-functional monomer is present in an amount of from 5% to 15%.

10. A coating composition as recited in claim 9 in which said hydroxy-functional copolymer consists of acrylic monomers and said hydroxy monomer is an hydroxyalkyl acrylate or methacrylate containing from 2 to 4 carbon atoms in the alkyl group, and said copolymer is present in an amount of from 5% to 50% of total resin solids.

11. A coating composition as recited in claim 10 in which said copolymer is present in an amount of from 20% to 45% of total resin solids and comprises at least 50% of methyl methacrylate.

12. A coating composition as recited in claim 1 in which said curing agent is an aminoplast resin.

13. A coating composition as recited in claim 1 in which said fluorocarbon polymer is present in an amount of at least about 47% of total resin solids and said mica and aluminum flake are used in a total weight ratio with respect to said fluorocarbon polymer, acrylic copolymer and curing agent of from 0.1 to 0.3.

14. A coating composition as recited in claim 1 in which said aminoplast resin is a polyalkoxymethyl melamine resin containing from 1 to 4 carbon atoms in the alkoxy group and present in an amount of from 3% to 30% of said hydroxy-functional copolymer.

15. A thermosetting solvent solution coating composition which cures to provide the appearance of anodized aluminum comprising a dispersion of a polyvinylidene fluoride in volatile organic solvent, said dispersion being pigmented with a finely divided mica coated with from 10% to 45% of titanium dioxide based on the weight of the coated mica, the platelets of said mica have a longest dimension of less than 100 micrometers, and an aluminum flake to provide a combination of whiteness and transparancy providing an anodized aluminum appearance, said aluminum flake being acid-resistant and passing through a 100 mesh screen, said pigmented dispersion containing an hydroxy-functional acrylic copolymer and an aminoplast curing agent therefor to provide a thermosetting cure which enhances the hardness and abrasion resistance of the coating, enough additional pigment to provide sufficient coloration to allow production control without providing enough opacity to hide the whiteness and metallic appearance provided by the combination of mica and aluminum flake, a flatting agent to reduce the gloss into the range of 10–20% reflectance measured in a 60° gloss meter, and a wax providing surface lubricity which aids mar resistance.

16. A coating composition as recited in claim 1 in which said mica is used in a weight ratio with respect to said aluminum flake of from 1:1 to 6:1.

17. A coating composition as recited in claim 1 in which said mica and aluminum flake are used in a weight ratio with respect to said fluorocarbon polymer, acrylic copolymer and curing agent of 0.05 to 0.4.

18. An aluminum substrate adherently coated with a baked film of the coating composition of claim 1.

19. The coated substrate recited in claim 18 in which said substrate is an aluminum panel adapted for architectural purposes and only a single coating having a thickness of from 0.7 to 2.0 mils is present.

* * * * *